United States Patent [19]

Okumura

[11] 3,972,715
[45] Aug. 3, 1976

[54] PARTICLE ORIENTATION IMAGING SYSTEM

[75] Inventor: Koji Okumura, Penfield, N.Y.

[73] Assignee: Xerox Corporation, Stamford, Conn.

[22] Filed: Oct. 29, 1973

[21] Appl. No.: 411,595

[52] U.S. Cl. .................. 96/1 R; 96/1 E; 96/1.1; 96/1.5; 96/1.8; 307/88 ET; 360/56
[51] Int. Cl.² .................. G03G 13/12; G03G 13/22
[58] Field of Search .............. 96/1 R, 1 E, 1.1, 1.5, 96/1.8, 1 PE, 1 M, 1 PS; 360/56; 307/88 ET

[56] References Cited
UNITED STATES PATENTS

| | | | |
|---|---|---|---|
| 2,798,959 | 7/1957 | Molerieff-Yeates | 96/1 E |
| 2,940,847 | 6/1960 | Kapreliau | 96/1 PE |
| 3,275,757 | 9/1966 | Sasseew | 360/56 X |
| 3,276,031 | 9/1966 | Gaynor | 96/1.1 X |
| 3,510,419 | 5/1970 | Carreira et al. | 96/1 PE |
| 3,513,449 | 5/1970 | Young | 96/1.1 X |
| 3,556,781 | 1/1971 | Levy | 96/1 PS |
| 3,573,904 | 4/1971 | Clark | 96/1 M |
| 3,653,892 | 9/1972 | Gundlach et al. | 96/1 M X |
| 3,671,231 | 6/1972 | Haas et al. | 96/1 R |
| 3,757,353 | 9/1973 | Jeffers | 360/56 |

*Primary Examiner*—Roland E. Martin, Jr.
*Attorney, Agent, or Firm*—James J. Ralabate; Michael H. Shanahan; John H. Faro

[57] ABSTRACT

An imaging system wherein an imaging member comprising a layer of softenable substantially electrically insulating material containing a dispersion of randomly oriented electrically photosensitive orientation particles is imaged by: (A) applying a uniform electric field across said member, (B) imagewise exposing said member to activating electromagnetic radiation, and (C) developing said member by decreasing the resistance of said softenable layer to reorientation of said orientation particles sufficiently to allow imagewise reorientation of said orientation particles.

10 Claims, 8 Drawing Figures

PARTICLE ORIENTATION IMAGING SYSTEM

BACKGROUND OF THE INVENTION

This invention relates to particle orientation imaging, and, in particular, to a system for creating images by selective imagewise orientation of particles suspended within a softenable electrically insulating layer.

Some particle orientation imaging processes have been employed to develop imagewise reproductions. One such process is disclosed in U.S. Pat. No. 3,485,621. There, a recording method is disclosed wherein plate-like diamagnetic anisotropic particles are dispersed in a thermoplastic layer and selectively reoriented by application of an electrostatic field transverse to said layer while said layer is held in a softened condition. To record data by means of an optical input system, it is herein taught that a photoconductive sheet must be placed over the film surface and in contact therewith. The photoconductive sheet receives the optical data and converts it into an electrostatic charge pattern on the film surface.

Another patent which is encompassed by the broad category of particle orientation imaging is U.S. Pat. No. 3,513,449. Disclosed therein is a recording media comprising a pre-oriented dispersion of dichromophoric photoconductive bodies contained in an insulating softenable matrix. The radiation used in exposure is highly coherent, relatively monochromatic electromagnetic radiation.

U.S. Pat. No. 3,171,106 discloses orientation of magnetic particles dispersed in a thermoplastic storage medium by means of *magnetic* fields. Read-out is by means of an electron microscope optical system "responsive to the alignment of the axis of the magnetic particles." More specifically, the medium is made plastic by heating; the particles are first uniformly aligned and then selectively oriented; finally, the medium is hardened and ready for storage and/or read-out.

SUMMARY OF THE INVENTION

The instant invention improves and simplifies the art of particle orientation imaging. No longer is it necessary to use special overlayers, pre-oriented particle layers or coherent radiation sources to produce images from optical input.

It is an object of this invention to provide a simple particle orientation imaging system which does not require expensive coherent radiation sources to produce useful exposures.

It is a further object of this invention to provide an effective particle orientation imaging system which does not require photoconductive overlays or pre-oriented particles to produce high quality images from optical input.

It is a further object of this invention to provide an imaging system wherein the exposing and softening steps may be interchanged and developing may occur simultaneously with either or both exposing and softening.

It is a further object of this invention to provide a particle orientation imaging system for creating micro-imaging-quality transparencies.

It is a further object of this invention to provide a positive-to-negative particle orientation imaging system which, through the use of electrets, requires very small external field to produce useful images.

It is a still further object of this invention to provide a system of particle orientation imaging wherein photoconductive or electret particles are re-oriented by an imagewise exposure to electromagnetic radiation.

It is an even still further object of this invention to provide a novel positive-to-positive particle orientation imaging system.

The above and still further objects of the invention are achieved in accordance with this invention by providing an imaging system wherein an imaging member comprising a layer of softenable substantially electrically insulating material containing a dispersion of randomly oriented electrically photosensitive orientation particles is imaged by: (A) applying a uniform electric field across said member, (B) imagewise exposing said member to activating electromagnetic radiation, and (C) developing said member by decreasing the resistance of said softenable layer to reorientation of said orientation particles.

BRIEF DESCRIPTIONS OF THE DRAWINGS

For a better understanding of the invention, as well as other objects and further features thereof, reference is made to the following detailed disclosure of the invention taken in conjunction with the accompanying drawings wherein.

Figure 3A:
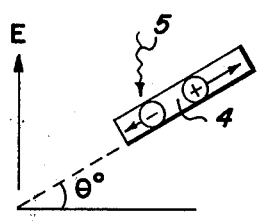
Figure 3B:
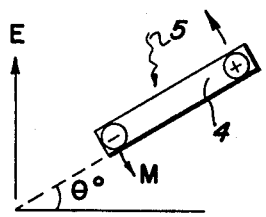
Figure 3C:
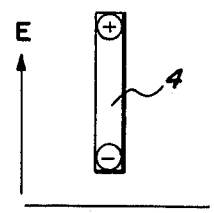

FIGS. 3a, 3b, and 3c are schematic representations of the polarization process as it is thought to occur in one type of orientation particle.

Figure 4A:
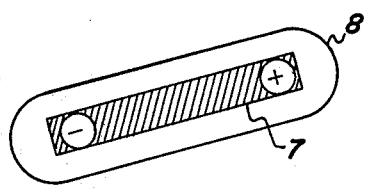
Figure 4B:
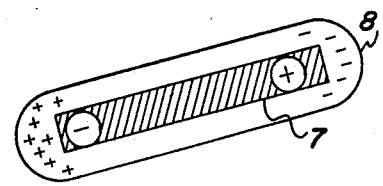

FIGS. 4a and 4b, similar to FIGS. 3a, b and c, show the polarization of a different type of orientation particle.

Figure 2:
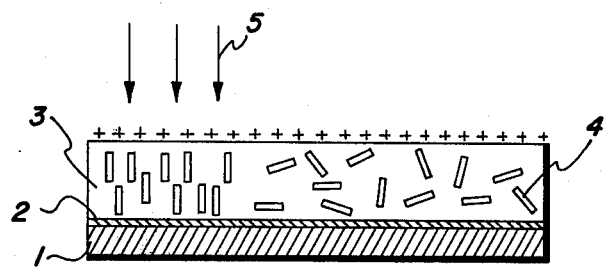
FIG. 2 is a partially schematic, cross-sectional view, similar to FIG. 1, showing orientation of selected electrically photosensitive orientation particles after an imagewise exposure to electromagnetic radiation.
Figure 5:
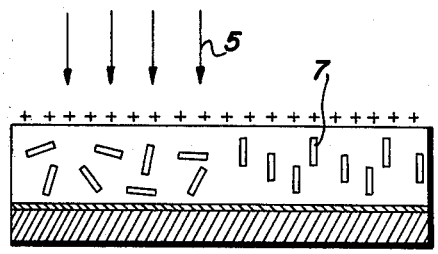

FIG. 5 is similar to FIG. 2, shows another embodiment of the novel imaging member according to the invention, after exposure to electromagnetic radiation.

DESCRIPTION OF THE PREFERRED EMBODIMENTS

Figure 1:
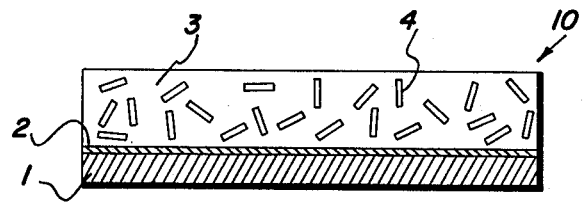
FIG. 1 is a partially schematic, cross-sectional view of one embodiment of the imaging member of the invention, showing random location of the electrically photosensitive orientation particles within the softenable layer.

In FIG. 1 one embodiment of an imaging member for use in the advantageous system of the present invention is illustrated, wherein imaging member 10 comprises a softenable layer 3 having submicron sized electrically photosensitive orientation particles 4 dispersed throughout the softenable layer. In the embodiment illustrated in FIG. 1, the imaging member is shown upon substrate 1 and conductive layer 2. It is noted that although the composite imaging member 10 illustrated in FIG. 1 shows a softenable layer 3 already in contact with conductive substrate 2, the imaging member comprising the softenable layer having electrically photosensitive orientation particles dispersed therein may, alternatively, be self-supporting and brought into contact with any substrate which is suitable for use in the inventive system.

Referring now more specifically to the individual elements illustrated in FIG. 1, the substrate 1 generally facilitates the charging or sensitization of the member according to the optimum electrical-optical mode of the invention when the substrate is electrically conductive. Typically this substrate may be of copper brass, nickel, zinc, chromium, stainless steel, conductive plastics and rubbers, aluminum, steel, cadmium, silver, gold or paper rendered conductive by the inclusion of a suitable chemical or conditioning in a humid atmosphere to insure the presence therein of sufficient water content to render the material conductive. On the other hand, as shown in FIG. 1, the substrate may be an insulator such as glass, paper or plastic, having a conductive layer 2 coated thereon. Examples of this type of substrate are a substantially transparent tin oxide coated glass available under the trademark "NESA" from the Pittsburgh Glass Company, aluminized polyester film, available under the trademark "Mylar", available from DuPont, or Mylar coated with copper iodide.

Softenable layer 3, which may comprise one or more layers of softenable materials, may be any suitable material, typically a plastic or thermoplastic material which is softenable, in a solvent liquid, solvent vapor, heat or combinations thereof. In addition, for the optimum electrical-optical mode of the advantageous system of the present invention, the softenable layer 3 is typically substantially electrically insulating with a bulk resistivity of above about $10^{10}$ ohm-cm.

Typical softenable materials include Staybelite Ester, a partially hydrogenated rosin ester, Foral Ester, a hydrogenated rosin triester, and Neolyne 23, an alkyd resin, all from Hercules Powder Co.; SR type silicone resins available from General Electric Corporation; Sucrose Benzoate, Eastman Chemical; Velsicol X-37, a polystyrene-olefin copolymer from Velsicol Chemical Corp.; Hydrogenated Piccopale 100, Piccopale H-2, highly brached polyolefins, Piccotex 100, a styrene-vinyl toluene copolymer, Piccolastic A-75, A-50, E-50, 100 and 125 all polystyrenes, Piccodiene 2215, a polystyrene-olefin copolymer, all from Pennsylvania Industrial Chemical Corp.; Nirez 1085, a polyterpene resin from Tenneco Chem., Inc.; Araldite 6060 and 6071, epoxy resins from Ciba; R5061A, a phenylmethyl silicone resin, from Dow Corning; Epon 1001, a bisphenol A-epichlorohydrin epoxy resin, from Shell Chemical Corp.; and PS-2, PS-3, both polystyrenes, and ET-693, a phenol-formaldehyde resin, from Dow Chemical; custom synthesized copolymers of styrene and hexylmethacrylate, a custom synthesized polydiphenylsiloxane; a custom synthesized polyadipate; acrylic resins available under the trademark Acryloid from Rohm & Hass Co., and available under the trademark Lucite from the E. I. DuPont de Numours & Co.; thermoplastic resins available under the trademark Pliolite from the Goodyear Tire & Rubber Co.; a chlorinated hydrocarbon available under the trademark Aroclor from Monsanto Chemical Co.; thermoplastic polyvinyl resins available under the trademark Vinylite from Union Carbide Co.; other thermoplastics disclosed in Gunther et al. U.S. Patent No. 3,196,011; waxes and blends, mixtures and copolymers thereof.

The above group of materials is not intended to be limiting, but illustrative of materials suitable for softenable layer 3. The softenable layer is preferably of a thickness in the range of between about 2 microns and about 5 microns. A more general range of from about ½ micron to 20 microns in thickness is suitable, however, it should be noted that the upper end of the range is limited only by the selection of materials, and their ability to transmit light to intermediate and lower level particles.

The electrically photosensitive orientation particles may comprise any suitable electrically photosensitive orientation particles which are not substantially degraded by the softening medium used to soften material 3.

While photoconductive particles, (and "photoconductive" is used in its broadest sense to mean particles which show increased electrical conductivity when illuminated with electromagnetic radiation and not necessarily those which have been found to be useful in xerography) have been found to be a class of particles useful as electrically photosensitive orientation particles in this invention, and while the photoconductive effect is often sufficient in the present invention to provide an electrically photosensitive orientation particle, it does not appear to be a necessary effect. Apparently, the necessary effect according to the invention is the selective relocation of charge within the particles, said relocation being effected by light action on the bulk or the surface of the electrically photosensitive orientation particle, by exposing said particle to activating radiation.

In each of the embodiments herein disclosed, it is to be understood that the orientation particles are all electrically photosensitive and the materials set forth can, where suitable, be used equally well in each.

One embodiment, shown in FIG. 1, is directed to a substantially homogeneous particle which comprises any suitable inorganic or organic material that can be formed in the shape of flakes or rods as used herein. Typical inorganic materials are selenium, selenium alloyed with arsenic, tellurium, antimony, or bismuth, etc.; cadmium sulfide, zinc oxide, cadmium sulfoselenide, and many others. U.S. Pat. No. 3,121,006 to Middleton et al. admirably sets forth a whole host of typical inorganic photosensitive pigments which in flake or rod form are suitable for use herein. Typical organic materials are: Watchung Red B, a barium salt of 1-(4′-methyl-5′chloro-azobenzene-2′-sulfonic acid)-2-hydrohydroxy-3-naphthoic acid, C. I. No. 15865, available from DuPont; Indofast double scarlet toner, a Pyranthrone-type pigment available from Harmon Colors; quindo magenta RV-6803; a quinacridone-type pigment available from Harmon Colors; Cyan Blue, GTNF the beta form of copper phthalocyanine, C. I. No. 74160, available from Collway Colors; Monolite Fast Blue GS, the alpha form of metal-free phthalocyanine, C. I. No. 74100, available from Arnold Hoffman Co.; Diane Blue, 3,3′-methoxy-4,4′-diphenyl-bis (1′λ′azo-2′′-hydroxy-3′′-naphthanilide), C. I. No. 21180, available from Harmon Colors; and Algol G.C., 1,2,5,6-di(D,D′-diphenyl)-thiazole-anthraquinone, C. I. No. 67300, available from General Dyestuffs; Napthol Red B, 1-(2′-methoxy-5′-nitrophenylazo)-2-hydroxy-3′′-nitro-3-naphthonilide, available from Collway Colors; and Indofast Yellow Toner, a flavanthrone, available from Harmon Colors. A particularly preferred photosensitive pigment which gives outstanding results in the X-form of metal-free phthalocyanine produced by the method set forth in U.S. Pat. No. 3,357,989. The above list of organic and inorganic materials is illustrative of some of the typical materials, and should not be taken as a complete listing of electrically photosensitive materials suitable for use in the present invention.

The submicron sized substantially homogeneous electrically photosensitive orientation particles for use in this embodiment of the imaging member are preferably non-spherical flakes or rods and have a preferable length in the range of between about 0.2 microns and about 0.5 microns. A more general range of from about 0.05 microns to about 2.0 microns is suitable; however, in most instances it is preferable that the particle be approximately one order of magnitude less than the film thickness. This relative relationship allows for maximum contrast. Furthermore, it should be kept in mind that the particle must have at least sufficient clearance to rotate.

The particles are loaded into the softenable layer and allowed to assume random positions. With such a process, it is apparent that some particles will have an orientation angle $\theta$ of 0° and some 90°. Such particles will not rotate or be affected by the field E. Obviously, this will affect system efficiency, however, the number of such particles is extermely small and the affect is minimal.

Furthermore, it should be understood that the imaging member 10 need not be a plate, but may, in the alternative, be in any useful form, including a web, foil, laminate or like, strip, sheet, coil, cylinder, drum, endless belt, endless mobius strip, circular disk or other shape.

To obtain an image on the imaging member of FIG. 1, the surface of the softenable material is charged and the softenable layer is softened while the member is imagewise exposed to electromagnetic radiation. The orientation particles in the exposed areas of the softenable layer orient themselves to the direction of the electric field, i.e., the direction perpendicular to the plane of the imaging member.

It is possible to erase the developed image of the FIG. 1 embodiment of the inventive imaging system hereof. By reducing the resistance to reorientation, and simultaneously applying an AC current, the particles will once again assume random positions. Therefore, it can be seen that a single imaging member can be used again and again, or selectively erased for the updating of component information.

The mechanism of orientation of the substantially homogeneous electrically photosensitive orientation particles, as presently understood, is illustrated in FIGS. 3a, 3b and 3c. FIG. 3a shows a single orientation particle which is at a random angle with the plane of the imaging member before exposure. Exposure to electromagnetic radiation, shown at 5, causes a photocurrent along the side of the orientation particle, resulting in a polarization of charges in the orientation particle. The magnitude of polarization depends upon the voltage drop in the length of the orientation particle. The orientation particle acquires a dipole moment which interacts with the field E to produce a moment M acting upon the orientation particle, as illustrated in FIG. 3b. Consequently, the orientation particle rotates in the direction of increasing $\theta$ which in turn increases polarization. Thus, the orientation particle orients itself toward the direction perpendicular to the plane of the imaging member during exposure and after exposure as long as the media is soft and the external field is present.

Therefore, it can be seen that the degree in which a substantially homogeneous electrically photosensitive orientation particle orients itself depends upon: (a) photoconductor used, (b) intensity, wavelengths and duration of the light, (c) electric field applied, (d) size of orientation particle, (e) initial inclination angle $\theta$ and (f) viscosity of the media during and after exposure. In an exposure in which the above factors are selected for maximum results, all the illuminated orientation particles are oriented perpendicular to the plane of the imaging member, as illustrated in FIG. 2. The contrast of the image depends upon the opaqueness, color and size distribution of the orientation particles. Opaqueness and color of the photosensitive orientation particles can be altered, by either "dyeing" the crystal surface by Chemisorption of dye stuff or by doping suitable impurities. The gradient, or gamma, of the exposure versus density curve depends on the factors (a) – (f) described above, as well as such factors as size distribution of the orientation particles, density of the orientation particles in the emulsion, and the softening and hardening process of the softenable material during the exposure.

In a further embodiment of the invention, submicron-sized orientation particles of an electret which has permanent electric dipoles are used to produce a high resolution image. FIG. 5 shows an imaging member, similar to FIGS. 1 and 2, except that the orientation particles in the suspension are electrets. Electrets are old in the art; however, a further description can be found in the publication "Electrets and Related Electrostatic Charge Storage Phenomena" by Lawrence Baxt and Martin Perlman, copyright 1968 by Electrochemical Society, Incorporated; 30 East 42nd Street, New York, New York, which is hereby expressly incorporated herein by reference.

If the electret material used is opaque and the softenable layer is transparent, the randomly oriented orientation particles make the imaging member opaque. On the other hand, if the electret orientation particles are oriented perpendicular to the plane of the imaging member, the coating will become transparent. The orientation process for the individaul electret orientation particle is similar to that where photoconductive orientation particles are used; however, the moment acts on the former by the interaction between the individual dipoles and the applied field.

One process for making the electret orientation particles photosensitive is to precoat each with a thin film of photosensitive material, such as a chemi-sorbed photosensitive dye stuff. FIG. 4a illustrates a cross-section of an electret orientation particle 7 with photosensitive material 8 layered thereon. The permanent electric dipole of the orientation particle renders a built-in electric field in the photosensitive layer. It is believed that, when the orientation particle is illuminated, local charge distribution such as shown in FIG. 4b takes place in the photosensitive layer. The net result of illumination is the cancellation of the electric dipole in individual orientation particles due to the screening effect of the charges in the photosensitive surface layer. After the exposure, charging and softening steps, the non-illuminated area of the imaging member becomes transparent due to alignment of the electret orientation particles. The orientation particles in the illuminated area of the member fail to orient in the direction of the field, because of the nullified electric dipoles. Thus, the illuminated area is kept opaque while the non-illuminated area becomes transparent, as seen in FIG. 5, i.e., a reverse image is created.

The size requirements and range for electret flakes or rods is the same as that set forth in the above description of the substantially homogeneous electrically photosensitive particles.

Since each electret particle carries its own field, and each will, upon illumination and softening, interact with the adjacent particles, very little external field is necessary to produce an image. The required voltages, in the range of about 1 to about 2 volts per micron, are necessary mainly to give direction to the alignment process.

The color of dye used to dye the electret particles also determines the spectral response of the orientation particle. By combining two, or more, dyes with different spectral responses it is possible to manipulate response to cover varying sections of the spectrum.

Additionally, the electret embodiments can be imagewise exposed and put into dark storage for considerable periods of time before development.

The formation of an imaging member containing electret particles presents a situation not ordinarily encountered in the production of imaging members. Since the interaction between electrets is so strong, it is not unexpected to find that they tend to agglomerate during the formation of the imaging layer. This reaction does not completely prevent the final formation of an image; however, contrast and quality are much lower than desired. To eliminate the interaction between electrets, and therefore greatly improve image contrast and quality, it is advantageous to agitate or vibrate the member during solidification of the imaging layer. This can be done by hand or electro-mechanical means such as an ultrasonic vibrator.

Any suitable exposure levels may be used to advantage herein. Exposures for optimum quality images depend on many factors, including the type of photosensitive material employed. Illustratively, for selenium particles, a range of from about 0.05 ergs/cm$^2$ to about 50 ergs/cm$^2$ at about 4,000 angstrom unit wavelength of light will produce useful images.

While the majority of the disclosure hereof is directed to uniform charging of the imaging member, it can be appreciated that the necessary requirement is that a uniform d.c. field be created across the member. Many of the well known methods for applying fields can be used. For example, a suitable structure can be made by contacting the surface of the member with the conductive aluminum layer of a transparent NESA plate and applying a potential between this and the conductive substrate.

In all of the inventive embodiments herein contemplated, it is important to give consideration to the doping factor, i.e., the weight ratio of particles to softenable material. While higher and lower factors will produce images, it has been found that optimum results are obtained with doping factors in the range between about 1 and about 3. Lower doping factors produce images of lower relative contrast, while higher doping factors can result in no images at all due to the inability of particles to re-orient themselves.

EXAMPLE I

Arsenic triselenide crystalline flakes of approximately 0.2 micron average maximum dimension are produced for use as orientation particles by refining about 5 micron average maximum dimension arsenic triselenide crystalline flakes, available by special order of 2 As : 3 Se ratio from United Mineral and Chemical Corporation of New York City. The particles are loaded into a stainless steel container along with about 70 parts of ⅛ inch steel shot. The stainless steel container is suspended inside a cooling container, the suspension area containing dry ice to keep the temperature at approximately −60°C. The cooling container is then locked into a Red Devil "Quickie Mill" paint shaker available from Garden Laboratories. The materials are then milled for about 10 hours.

The crystalline materials are then removed and suspended in ordinary liquid kerosine. The mixture is then consecutively filtered through fine mesh filters of about 5 micron, 2 micron and 1 micron opening diameters.

The particle-carrying kerosine is then allowed to evaporate, leaving only the crystalline flakes of about 1 micron diameter or less.

A well-known gas separation technique is then used to remove the flakes of desired size. The particles are suspended in a cloud of Nitrogen gas and allowed to separate by gravitational filtration. The heavier particles fall out first, then, as the desired range is reached, a catch plate is inserted into the fallout chamber. The undesirable small particles stay in suspension.

A binder configuration imaging member is made by forming an about 3 micron thick insulating layer of a transparent custom synthesized copolymer of polystyrene and hexylmethacrylate of a molecular weight of about 45,000 weight average on about a 3 mil thick substrate of Mylar polyester film from DuPont overcoated with a thin aluminum layer which is about 50% visible light transmissive. The particles produced in the first four paragraphs are dispersed in a random fashion in the polystyrene copolymer in a weight ratio of about 2:1. The member would appear black in color when viewed by the naked eye.

The imaging member is uniformly charged to a surface potential of about +50 volts and exposed for 3 seconds to a resolution target through a microscope illuminator placed 2 feet away, exposure in the illuminated areas being equivalent to about 10 ergs/cm$^2$ at 400 nanometers.

The member is then uniformly heated to about 80°C for 5 seconds to allow imagewise reorientation of particles.

The above process steps are carried out in the dark.

After cooling, the member can be inspected and found to contain a high resolution image exceeding 200 line pairs per millimeter. The particles in the exposed areas have aligned perpendicularly to the surface of the member thus causing the member to appear relatively transparent in those areas.

EXAMPLE II

The imaged member of Example I is heated to a temperature of about 80°C and, simultaneously therewith, a charge of about 50 volts A.C. is applied uniformly thereto.

After cooling, it can be observed that no visible image exists on the member.

EXAMPLE III

The erased member of Example II is charged, exposed and developed as set forth in Example I.

It can be observed that the image thus created is of high quality and resolution. Furthermore, it can be observed that no ghosting occurs, thus indicating that complete erasure took place in the process steps of Example II.

EXAMPLES IV–VII

Example I is followed except that the orientation particles are respectively:

Anthracene
Trigonal Selenium
Hexagonal Selenium
Cadmium Sulfide

EXAMPLE VIII

Colorless barium titanate flakes of about 5 microns average maximum dimension, available from United Mineral and Chemical Corporation of New York City are milled and filtered as set forth in Example I to obtain about 0.2 micron average maximum dimension orientation particles.

Metl free phthalocyanine, as disclosed in U.S. Pat. No. Re 27,117 is dissolved in chloronaphthalene and added to the orientation particles. The phthalocyanine is chemisorbed on the surface of each electret flake. The excess solvent and pigment is removed and the particles are dried.

A binder configuration imaging member is made by forming an about 3 micron thick insulating layer of a transparent custom synthesized copolymer of polystyrene and hexylmethacrylate of a molecular weight of about 45,000 weight average on about a 3 mil thick substrate of Mylar polyester film from DuPont overcoated with a thin aluminum layer which is about 50% light transmissive. The orientation particles are dispersed in a random fashion in the polystyrene copolymer in a weight ratio of about 2:1. The member would appear blue in color when viewed by the naked eye.

The imaging member is uniformly charged to about +5 volts and exposed for 3 seconds to a negative resolution target with red light of about 0.8 micron wavelength placed 2 feet away.

The member is then uniformly heated to about 80°C for 5 seconds to allow orientation to occur.

The above process is carried out in the dark.

After cooling, the member can be inspected and found to contain a reverse image compared to the target. The resolution is lower than that created in Example I, but of acceptable quality.

EXAMPLE IX

Example VIII is followed except that after the particles are added to the polystyrene copolymer, and during solidification thereof, the member is uniformly agitated to produce a more uniform dispersion of particles.

The image thus created is of higher quality and resolution than that of Example VIII, but of lesser than that of Example I.

Although specific components, proportions and process steps have been stated in the above description of preferred embodiments of the imaging system, other suitable materials, proportions and process steps, as listed herein, may be used with satisfactory results and varying degrees of quality. In addition, other materials which exist presently or may be discovered may be added to materials used herein to synergize, enhance or otherwise modify their properties.

For example, the particle need not be a solid photosensitive flake or rod. An inert fiber or flake can be dyed with a photosensitive pigment to produce the desired particle. For example, mica flakes, asbestos or silk fibers can be dyed with any of the well known photosensitive pigments.

Furthermore, it should be noted that the softenable material need not be rigid at room temperatures. It is necessary only that the material be of sufficient viscosity to resist particle orientation.

Furthermore, for example, the structures and methods of the invention may be used for producing images of all kinds, those to be read out by the human eye as well as those to be read out be physical or mechanical read-out equipment, such as those using light reflection, radiation, electrical conductivity, magnetic properties and the like as the means for reading the image. Furthermore, the voltage variation patterns created on the surface of the imaging member can be toned and the image transferred to paper to provide hard copy reproductions.

It will be understood that various changes in the details, materials, steps and arrangements of parts, which have herein been described and illustrated in order to explain the nature of the invention, will occur to, and may be made by those skilled in the art upon a reading of the disclosure within the principles and scope of the invention.

What is claimed is:

1. An imaging method comprising:
    a. providing an imaging member comprising a layer of substantially electrically insulating softenable material having randomly oriented non-spherical electrically photosensitive particles suspended therein, said layer having a thickness above about 0.5 micron and said softenable material capable of having its resistance to orientation of particles in said softenable material reduced;
    b. applying a uniform d.c. electric field across said imaging member;
    c. imagewise exposing said imaging member to electromagnetic radiation; and
    d. developing said imaging member by decreasing the resistance to reorientation of said elecrically photosensitive particles by softening said softenable layer at least sufficiently to allow imagewise reorientation of said electrically photosensitive particles, whereby there is substantially no particle migration in depth.

2. The method of claim 1, wherein: said electrically photosensitive particles are submicron-sized.

3. The method of claim 1 wherein; said electrically photosensitive particles are electrets coated with a layer of electrically photosensitive material.

4. The imaging method of claim 1 further comprising the step of hardening said softenable layer to freeze the developed image.

5. The imaging method of claim 1 wherein: the steps of exposing, softening and developing occur substantially simultaneously.

6. The method of claim 1, wherein: said electrically photosensitive particles comprise inert particles coated with a layer of electrically photosensitive material.

7. The method of claim 1 wherein said uniform electric field is a surface charge.

8. A method of erasing an imaged orientation imaging member comprising the steps of:
    a. providing an imaged orientation imaging member comprising a layer of electrically insulating softenable material containing non-spherical electrically photosensitive particles aligned in the imagewise exposed areas and randomly oriented in the non-imagewise exposed areas, said layer having a thickness above about 0.5 micron; and
    b. applying a a.c. voltage to the surface of said member while simultaneously decreasing the resistance to electrically photosensitive particle reorientation by softening said softenable layer at least sufficiently to allow reorientation of said electrically photosensitive particles.

9. An imaging method comprising:
a. providing an imaging member comprising a layer of substantially electrically insulating softenable material having randomly oriented non-spherical electrically photosensitive particles suspended therein, said layer having a thickness above about 0.5 micron and said softenable material capable of having its resistance to orientation of said particles in said softenable material reduced;
b. applying an imagewise d.c. electric field pattern to said imaging member;
c. uniformly exposing said member to electromagnetic radiation; and
d. developing said imaging member by decreasing the resistance to reorientation of said electrically photosensitive particles by softening said softenable layer at least sufficiently to allow imagewise reorientation of said electrically photosensitive particles, whereby there is substantially no migration in depth.

10. The method of claim 9 wherein said electrically photosensitive particles are electrets coated with a layer of electrically photosensitive material, and said exposing step follows the application of an imagewise electric field pattern.

* * * * *